United States Patent
Abergel et al.

(10) Patent No.: US 10,316,206 B2
(45) Date of Patent: Jun. 11, 2019

(54) VARNISH COMPOSITION WITH LOW LEVELS OF MIGRATION FOR INKJET-PRINTED SUBSTRATE

(71) Applicant: MGI Digital Technology, Fresnes (FR)

(72) Inventors: Edmond Abergel, Paris (FR); Hadrien Berny, Choisy-le-roi (FR)

(73) Assignee: MGI Digital Technology, Fresnes (FR)

( * ) Notice: Subject to any disclaimer, the term of this patent is extended or adjusted under 35 U.S.C. 154(b) by 0 days.

(21) Appl. No.: 15/763,285

(22) PCT Filed: Sep. 26, 2016

(86) PCT No.: PCT/EP2016/072811
§ 371 (c)(1),
(2) Date: Mar. 26, 2018

(87) PCT Pub. No.: WO2017/055203
PCT Pub. Date: Apr. 6, 2017

(65) Prior Publication Data
US 2018/0273782 A1 Sep. 27, 2018

(30) Foreign Application Priority Data
Sep. 28, 2015 (EP) .................... 15290245

(51) Int. Cl.
*C09D 11/30* (2014.01)
*B41M 7/00* (2006.01)
*C09D 11/101* (2014.01)

(52) U.S. Cl.
CPC ........... *C09D 11/30* (2013.01); *B41M 7/0045* (2013.01); *C09D 11/101* (2013.01); *B41M 7/0081* (2013.01)

(58) Field of Classification Search
CPC . B41M 7/0045; B41M 7/0081; C09D 11/101; C09D 11/30
See application file for complete search history.

(56) References Cited

U.S. PATENT DOCUMENTS

| 4,107,012 A * | 8/1978 | Fuhr ..................... C08F 283/01 522/43 |
| 2008/0018725 A1 | 1/2008 | Mogi et al. |
| 2008/0225099 A1 | 9/2008 | Cohen et al. |
| 2010/0071828 A1 * | 3/2010 | Sato ........................ B05D 7/14 156/60 |

FOREIGN PATENT DOCUMENTS

| EP | 2703457 A1 | 3/2014 |
| WO | WO-2014126720 A1 | 8/2014 |

* cited by examiner

Primary Examiner — Anh T Vo
(74) Attorney, Agent, or Firm — Harness, Dickey & Pierce, P.L.C.

(57) ABSTRACT

The invention relates to a varnish with low levels of migration for covering the surface of an inkjet-printed and inkjet-deposited substrate, the composition of the varnish comprising at least: a hardenable monofunctional acrylate monomer; a hardenable difunctional diacrylate monomer; a hardenable acrylate monomer and/or oligomer with a sole acrylate functionality, said functionality being between 3 and 6; and a photoinitiator.

17 Claims, 1 Drawing Sheet

| Product Name | Type | Name | η (mPa.s) | % Weight | Molar mass (g/mol) |
|---|---|---|---|---|---|
| Genorad 16 | antioxidant | / | | 1 | ND |
| HDDA | Diacrylates | Hexanediol diacrylate | 6 | 10 | 226 |
| Irgacure 819 | Photo-initiator | Bis-(2,4,6-trimethylbenzoyl) oxide | | 3 | 418.5 |
| Esacure one | Photo-initiator | Difunctional α-hydroxy ketone | | 2.9 | 408 |
| Omnipol 2702 | Photo-initiator | Difunctional benzophenone derivative | | 5 | 620 |
| Omnipol ASA | Photo-initiator | Polymeric amine/polymeric aminobenzoates | 530 | 5 | 532 |
| DPGDA | Diacrylates | Dipropylene glycol diacrylate | 10 | 10 | 252 |
| EB 110 | Monoacrylates | Phenoxyethyl acryl ethoxyl twice | 20 | 15 | ND |
| CTFA | Monoacrylates | Cyclic Trimethylolpropane Formal Acrylate "CTFA" | 15 | 5.6 | 200 |
| MPDA | Diacrylates | 3 Methyl 1,5 pentanediol diacrylate | 6 | 15 | 226 |
| TMP3POTA | Triacrylates | Propoxylated (3) Trimethylolpropane Triacrylate | 80 | 15 | 470 |
| Ebercryl Leo 10101 | polyacrylates | Triacrylate resin | 4000 | 10 | 1000 |
| Byk nano 3650 | nanoparticles | Silica nanoparticles | 10 | 2 | ND |
| BYK UV 3530 | surfactant | Crosslinking silicone-containing surface additive | | 0.5 | ND |
| | | | | 100 | |

| Product Name | Type | Name | η (mPa.s) | % Weight | Molar mass (g/mol) |
|---|---|---|---|---|---|
| Genorad 16 | antioxidant | / | | 1 | ND |
| HDDA | Diacrylates | Hexanediol diacrylate | 6 | 10 | 226 |
| Irgacure 819 | Photo-initiator | Bis-(2,4,6-trimethylbenzoyl) oxide | | 3 | 418.5 |
| Esacure one | Photo-initiator | Difunctional α-hydroxy ketone | | 2.9 | 408 |
| Omnipol 2702 | Photo-initiator | Difunctional benzophenone derivative | | 5 | 620 |
| Omnipol ASA | Photo-initiator | Polymeric amine/polymeric aminobenzoates | 530 | 5 | 532 |
| DPGDA | Diacrylates | Dipropylene glycol diacrylate | 10 | 10 | 252 |
| EB 110 | Monoacrylates | Phenoxyethyl acryl ethoxyl twice | 20 | 15 | ND |
| CTFA | Monoacrylates | Cyclic Trimethylolpropane Formal Acrylate "CTFA" | 15 | 5.6 | 200 |
| MPDA | Diacrylates | 3 Methyl 1,5 pentanediol diacrylate | 6 | 15 | 226 |
| TMP3POTA | Triacrylates | Propoxylated (3) Trimethylolpropane Triacrylate | 80 | 15 | 470 |
| Ebercryl Leo 10101 | polyacrylates | Triacrylate resin | 4000 | 10 | 1000 |
| Byk nano 3650 | nanoparticles | Silica nanoparticles | 10 | 2 | ND |
| BYK UV 3530 | surfactant | Crosslinking silicone-containing surface additive | | 0.5 | ND |
| | | | | 100 | |

VARNISH COMPOSITION WITH LOW LEVELS OF MIGRATION FOR INKJET-PRINTED SUBSTRATE

CROSS-REFERENCE TO RELATED APPLICATIONS

This application is a 371 U.S. National Stage of International Application No. PCT/EP2016/072811, filed Sep. 26, 2016 and published in French as WO2017/055203 A1 on Apr. 6, 2017. This application claims the benefit of European Patent Application No. EP 15290245.8, filed on Sep. 28, 2015. The disclosure of each of the above-identified applications is incorporated by reference as if set forth in their entirety herein.

The present invention relates to the field of coating and/or protective layers for substrates, preferably for printed substrates, and more specifically to the field of light-curing inkjet-deposited varnish which does not need significant heating at depositing due to the viscosity feature thereof. More specifically, the present invention relates to the field of an inkjet-deposited, light-curing varnish for coating packaging materials, which, when hardened, leads to minimum contamination of the packaged products, e.g. cosmetic products and/or food.

During printing, ink is deposited onto the surface of a substrate, where this substrate can be, e.g., paper, flat cardboard, corrugated or micro-corrugated cardboard, or plastic. It is then common to cover the printed surface of this substrate with a protective layer. This protective layer completes the attachment of the printed image onto the substrate while guaranteeing the resistance of printing against certain exterior aggressions, e.g. projections, frictions, and even light, heat or humidity. The deposit of this protective layer onto the printed substrate is carried out, e.g. by using a system of inkjet printing to favour the selectivity of deposition zones. The varnish is also used to customise the document by making appear zones with varnish patterns and other zones without varnish, and this whether the substrate had been printed beforehand or not.

The present application relates more specifically to a varnish with low viscosity as new printing heads require low viscosity products to be used. However, the decrease of varnish viscosities required by the use of printing heads using the latest technologies raises the issue of drying and/or polymerisation of the varnish after printing. Indeed, the less viscous the varnish, the more time it takes for the drying or polymerisation of the varnish and the more the printing rates decrease if the transfer rate of the printed substrate is reduced in a UV oven, to achieve an adequate polymerisation. Furthermore, UV drying or polymerisation have sometimes the disadvantage of heating the printed substrate, which can be damaging. Moreover, with the new inkjet heads accepting lower viscosities, if varnishes with high viscosity, not suitable for the viscosity required by these new heads, are to be used, the temperature has to be increased to reduce viscosity. In addition to a detrimental energy consumption, these high temperatures have an influence on the service life of the printing heads or require the use of specific materials making the heads more expensive.

The present invention also relates to the field of inkjet-deposited light-curing varnish for coating packaging materials for food, which, when hardened, does not lead to any contamination of the food. Indeed, when these light-curing varnishes are applied (without contact) onto the surface of the primary or secondary packaging intended for food, one has to make sure that the varnish meets the criteria of low migration in order to prevent any contamination of the food. Corresponding standards/directives have already been stated and continue to evolve so as to prevent varnish components from representing a danger to human health, and/or from leading to an unacceptable modification of the food composition, and/or from generating a deterioration of the organoleptic properties and/or a deterioration of the primary and/or secondary and/or tertiary packaging items.

The WO2014/126720 patent application claims a UV-curing low-migration ink, the composition of which includes at least one photo-initiator characterised in that the level thereof of photo-initiator with a molecular weight of less than 500 g/mol is of at least 40% by weight of the total of said photo-initiator. No ink formulations according to the present invention uses a monofunctional monomer because WO2014/126720 indicates that these have to be avoided in order to prevent non-reacting monofunctional monomers from migrating into the food.

The objective of the present invention is to compensate for one or more disadvantages of the prior art by providing a coating ink suitable not only for the low-migration requirements of the packaging field (e.g. packaging in the health and/or aesthetics industry, e.g. the pharmaceutical and/or cosmetics industry, and, more specifically, packaging for the food industry), but also to limit the risks of alteration of printing heads, operating in temperature intervals which do not impose a significant heating of the varnish during the deposition thereof onto the printed substrate and/or suitable for printing heads requiring low-viscosity products and/or suitable for quick drying and/or polymerisation thus making it possible to maintain high printing rates and/or not needing to heat the substrates. More particularly, an additional objective of the varnish according to the present invention, consists in that same can be printed onto the substrate, preferably using inkjet technology, with deposit thicknesses of more than 3 microns, 5 microns, 10 microns, 50 microns and/or 100 microns, and even thicknesses that can reach 300 microns while preserving the low-migration properties thereof.

An additional objective according to the present invention consists in that same is acknowledged as a GHS07 category, thus also meeting the requirements of the "Globally Harmonized System of Classification and Labelling of Chemicals".

An additional objective of the varnish according to the present invention when the varnish is used as varnish for coating a substrate, consists of the exceptional property thereof of resistance to yellowing. The Applicant has indeed developed a special varnish composition with low migration, which does not yellow, which is a significant advantage compared with the low-migration inks already described in the literature.

These objectives are reached using a varnish for coating the surface of a substrate and inkjet-deposited, where the varnish composition includes at least
  i. a light-curing acrylate monofunctional monomer,
  ii. a light-curing diacrylate bifunctional monomer,
  iii. a light-curing acrylate monomer with the only acrylate functionality, where said functionality is comprised between 3 and 6,
  iv. a photo-initiator,
  v. an optional nanoparticle, and
  vi. an optional self-initiating resin,
  characterised in that
  the varnish contains at least 5% by weight of light-curing acrylate monofunctional monomer including at least two ethoxylations and/or propoxylations, the varnish contains at least 20% by weight of light-curing bifunctional diacrylate monomer, the varnish contains at least 5% by weight of light-curing acrylate monomer with only the acrylate functionality, said functionality being comprised between 3 and 6, said monomer including at least two ethoxylations and/or propoxylations, the photo-initiator contains 50% by weight of a photo-initiator with a molar mass of more than 400 g/mol, acrylate monomers and photo-initiators represent at least 45% by weight of varnish, and the varnish has a viscosity of less than 200 mPa·s at 25° C. and a surface tension comprised between 10 mN/m and 50 mN/m at 25° C.

The present invention also relates to the use of the varnish of the present invention as varnish in an inkjet printing technology including a drying and/or polymerisation step for said varnish, characterised in that the temperature to which said varnish is exposed when flowing through the printing heads, is comprised between 25 and 80° C., preferably between 35° C. and 50° C. and/or in that the drying also the polymerisation of said varnish is carried out within speed rates of 0.05 to 10 m/s, preferably from 0.05 to 2 m/s.

In certain embodiments of the present invention, the drying and/or polymerisation step of said varnish includes the exposure of the varnish to an ultra-violet radiation, e.g. UV radiation from a conventional UV lamp, or to UV radiation from a light-emitting diode (LED), preferably to UV radiation from the combination of a light-emitting diode (LED) and a conventional UV lamp.

The present invention also relates to the use of the varnish of the present invention—when the composition of said varnish contains at least one pigment and/or a dye as defined hereafter—directly as ink. This new use is particularly interesting from an industrial point of view because same makes it possible, through the inkjet printing of only one composition according to the present invention, to combine the properties of the ink and of the varnish, and to thus advantageously meet the requirements of the desired use. However, as indicated hereafter in the description, the present invention privileges the use of the varnish as transparent varnish, namely a varnish the composition of which does not include any colouring agent. This transparent varnish according to the present invention is characterised by a better resistance to yellowing.

The invention, with the features and advantages thereof, will become clearer when reading the description given with reference to the appended drawing where:

FIG. 1 represents a table stating the composition of the varnish according to the invention.

It should be noted that the molecules cited in the present document are not limiting for the composition of the varnish of the invention, but are illustrative for the monomer or polymer molecules which have or present similar or identical features, property or functions.

The present invention relates to a low-migration protective varnish intended for covering a part or the entire surface of a substrate, where said substrate can be, e.g. and in a non-limiting way, blank or printed beforehand. This varnish can be produced with or without a solvent; this varnish is thus produced as an illustration only, with or without water and/or with or without organic solvent (such as, e.g., methyl isobutyl ketone, dimethyl ketone, isopropyl alcohol, isobutyl alcohol, n-butyl alcohol, ethyl acetate, n-butyl acetate, ethyl cellosolve, butyl cellosolve, and other similar solvents).

The varnish according to the present invention thus includes in the composition thereof, at least i. a light-curing acrylate monofunctional monomer,
ii. a light-curing diacrylate bifunctional monomer, and
iii. a light-curing acrylate monomer with only one acrylate functionality, where said functionality being comprised between 3 and 6.

The varnish according to the present invention thus includes in the composition thereof, 5% by weight of light-curing acrylate monofunctional monomer containing at least two ethoxylations and/or propoxylations, preferably at least 7.5% by weight, e.g. at least 10% by weight. In certain embodiments of the present invention, the concentration of light-curing acrylate monofunctional monomer in the varnish not containing at least two ethoxylations and/or propoxylations, will be less than 10% by weight, preferably less than 1% by weight, e.g. less than 0.1% by weight.

Amongst the light-curing acrylate monofunctional monomers of the varnish, we will cite as an example, the monoacrylates and/or the compounds derived from said monoacrylates, taken in isolation or in a mixture of two or of a plurality of said compounds. As an illustration, we will cite aliphatic mono-acrylate alkyls and/or the derivatives thereof, more particularly aliphatic mono-acrylate alkyls with more than five carbon atoms and/or the derivatives thereof. As an illustration, we will cite aromatic mono-acrylate alkyls and/or the derivatives thereof, more particularly aromatic mono-acrylate alkyls with more than five carbon atoms and/or the derivatives thereof. We will cite as a non-limiting example 2-(2-Ethoxyethoxy)ethyl acrylate "EOEOEA", phenol ethoxylated mono-acrylate, cyclic trimethylopropane formal acrylate "CTFA", octyl/decyl acrylate "ODA" (which also has the property of decreasing the surface tensions in the varnish), tridecyl acrylate "TDA", octyl acrylate, isodecyl acrylate "IDA", 3,3,5-Trimethyl cyclohexyl acrylate, iso octyl acrylate "IOA", isobornyl acrylate "IBA", 3,3,5-Trimethyl cyclohexanol acrylate "TMCHA", tetrahydrofurfuryl acrylate "THFA", and/or a mixture of two or a plurality of said precited compounds.

The varnish according to the present invention thus includes in the composition thereof 20% by weight of light-curing diacrylate bifunctional monomer, preferably at least 25% by weight, e.g. at least 30% by weight. Light-curing diacrylate bifunctional monomers can advantageously include at least two ethoxylations and/or propoxylations. In a special embodiment of the present invention, the light-curing diacrylate bifunctional monomers consist of a mixture of diacrylates containing at least two ethoxylations and/or propoxylations with diacrylates which do not contain same; with, preferably, a ratio by weight between the two families of diacrylates comprised between 1:10 and 10:1, e.g. 1:3 and 3:1. Indeed, the Applicant has discovered that the use of only (amongst the family of light-curing diacrylate bifunctional monomer) certain light-curing diacrylate bifunctional monomers containing at least two ethoxylations and/or propoxylations and/or the use at a high concentration (e.g. of more than 91% by weight amongst the family of light-curing diacrylate bifunctional monomers) of certain light-curing diacrylate bifunctional monomers containing at least two ethoxylations and/or propoxylations, could lead to a toxicity and/or an instability of the varnish that is incompatible with the low-migration application sought within the framework of the present invention.

Amongst the light-curing acrylate bifunctional monomers which can complete the varnish composition, we will cite as an example, the diacrylates and/or the compounds derived from said diacrylates, taken in isolation or in a mixture of two or of a plurality of said compounds. As an illustration, we will cite aliphatic diacrylate alkyls and/or the derivatives thereof, more particularly aliphatic diacrylate alkyls with more than five carbon atoms and/or the derivatives thereof. As an illustration, we will cite aromatic diacrylate alkyls and/or the derivatives thereof, more particularly aromatic diacrylate alkyls with more than five carbon atoms and/or the derivatives thereof. We will cite as a non-limiting example, triethylene glycol diacrylate (TIEGDA), tripropylene glycol diacrylate (TPGDA), dipropylene glycol, diacrylate (DPGDA), polyethylene glycol diacrylate, polypropylene glycol diacrylate, propoxylated neopentyglycol diacrylate, hexanediol diacrylate (HDDA), esterdiol diacrylate (EDDA), 3-methyl-1,5-pentanediol diacrylate (MPDA), polybutadiene diacrylate (PBDDA), decanediol diacrylate (DDDA), tricyclodecanedimethanol diacrylate (TCD-DMDA), tetraethylene glycol diacrylate (TTEGDA), and/or a mixture of two or of a plurality of said precited compounds.

The varnish according to the present invention thus includes in the composition thereof 5% by weight of light-curing acrylate monofunctional monomer with the only acrylate functionality of which said functionality is comprised between 3 and 6 and contains at least two ethoxylations and/or propoxylations, preferably at least 7.5% by weight, e.g. at least 10% by weight. In certain embodiments of the present invention, the concentration in the varnish of light-curing acrylate monomers with only one acrylate functionality, where said functionality is comprised between 3 and 6 and not including at least two ethoxylations and/or propoxylations, will be less than 10% by weight, preferably less than 1% by weight, e.g. less than 0.1% by weight.

Amongst the light-curing acrylate monomers with only one acrylate functionality, where said functionality is comprised between 3 and 6, which can complete the varnish composition, we will cite as an example, triacrylates, tetraacrylates, pentaacrylates, hexaacrylates and/or the compounds derived from said acrylates, taken in isolation or as a mixture of two or a plurality of said compounds. As an illustration, we will cite aliphatic acrylate alkyls and/or the derivatives thereof, more particularly aliphatic acrylate alkyls with more than five carbon atoms and/or the derivatives thereof. As an illustration, we will cite aromatic acrylate alkyls and/or the derivatives thereof, more particularly aromatic acrylate alkyls with more than five carbon atoms and/or the derivatives thereof. We will cite as a non-limiting example, ethoxylated (3) trimethylolpropane triacrylate (TMP3EOTA), ethoxylated (6) trimethylolpropane triacrylate (TMP6EOTA), ethoxylated (9) trimethylolpropane triacrylate (TMP9EOTA), ethoxylated (15) trimethylolpropane triacrylate (TMP15EOTA), ethoxylated (20) trimethylolpropane triacrylate (TMP20EOTA), propoxylated glycerol triacrylate, trimethylolpropane propoxylated triacrylate (TMP3POTA), dipentaerythriol hexa acrylate, ditrimethylol propane tetra acrylate, pentaerythritol tetraacryltate (PETTA), trimethylolpropane triacrylate (TMPTA), ditrimethylolpropane triacrylate (Di-TMPTTA), tris (2-hydroxy ethel) isocyanurate triacrylate THEICTA, pentaerythritol triacrylate PETIA, di-pentaerythritol pentaacrylate (DiPEPA), ethoxylated (4) pentaerythritol tetraacrylate, ethoxylated 12 glyceryl triacrylate (G12EOTA) and/or a mixture of two or a plurality of said precited compounds.

The polymerization reaction when the varnish is projected onto the substrate surface is initiated by at least one photo-initiator. The varnish photo-initiator thus comprises at least 50% by weight of photo-initiator with a molecular weight of more than 400 g/mol, preferably at least 75% by weight, e.g. at least 90% by weight. In certain embodiments of the present invention, the varnish photo-initiator thus comprises at least 40% by weight of photo-initiator with a molecular weight of more than 500 g/mol, preferably at least 60% by weight, e.g. at least 70% by weight. In certain embodiments of the present invention, the varnish photo-initiator according to the present invention contains at least 20% by weight of photo-initiator with a molecular weight less than or equal to 400 g/mol, preferably of 10% by weight, e.g. less than 5% by weight.

Photo-initiators can advantageously represent at least 5% by weight of the varnish, e.g. at least 7.5% by weight of the varnish, and/or less than 25% by weight of the varnish, e.g. 20% by weight of the varnish. As an illustration, of the photo-initiators which can be advantageously used in the varnish composition according to the present invention, we will cite phenylbis(2,4,6-trimethylbenzoyl)phosphine oxide (known under the name of Irgacure 819), bifunctional alpha-hydroxy ketone (known under the name of Esacure one), bifunctional benzophenone derivative (known under the name of Omnipol 2702), polymeric aminobenzoates (known under the name of Omnipol ASA), polymeric benzophenones (known under the names of Omnipol BP and Genopol RP-2), piparazino based aminoalkylphenone (known under the name of Omnipol 9220), polymeric thioxanthones (e.g. Genopol TX-2 and/or Omnipol TX), and/or a mixture of two or a plurality of the precited photo-initiators.

In order to obtain better properties in terms of mechanical resistance, flexibility, and/or resistance to dirt, the varnish composition according to the present invention can advantageously integrate nanoparticles. The term nanoparticle is preferably used when at least one dimension of the nanoparticle is smaller than 300 nm, preferably smaller than 100 nm. As an illustration of the dispersion of nanoparticles which can advantageously be used in the varnish composition according to the present invention, we will cite the nanoparticles containing alumina and/or silica, e.g. BYK nanoparticles (e.g. NANOBYK 3601 and/or 3610 and/or 3650); we will also cite conductive and/or semi-conductive nanoparticles (e.g. containing silver and/or graphene, in order to provide the properties of conductive varnish); and/or a mixture of two or of a plurality of the precited compounds Nanoparticles can represent less than 10% by weight of the varnish, e.g. less than 5% by weight, preferably from 0.01 to 3.0% by weight of the varnish, e.g. 0.1% to 2.5 by weight of the varnish. When a nanoparticle as defined above is used in a varnish composition according to the present invention, same will be counted only in the nanoparticle category even if the composition thereof and/or the function thereof could also classify same in another category as described in the present invention.

In order to obtain an optimum spread of the varnish over the substrate surface, the varnish composition according to the present invention can advantageously integrate a surfactant. Surfactants can be used, such as, e.g. and in a non-limiting way, siloxane polyether, siloxane polyether acrylate, alkoxylated alcohol, and further a "silicon-free" surfactant. As an illustration of surfactants which can be advantageously used in the varnish composition according to the present invention, we will cite EVONIK surfactants (e.g. same from the TEGO range), BYK surfactants (e.g. BYK UV 3530), CYTEC surfactants, SARTOMER surfactants, and/or MOMENTIVE surfactants (e.g. same from the Coatosil, Baysilone and/or Silquest range), and/or a mixture of two or of a plurality of the precited compounds. The surfactant can represent less than 5% by weight of the varnish, preferably from 0.01 to 3.0% by weight of the varnish, e.g. 0.1% to 2.5 by weight of the varnish.

In order to prevent varnish caking under the action of heat in unwanted conditions, the varnish according to the present invention can integrate an antioxidant which plays the role of inhibitor of free radicals. The inhibition can be provided, e.g. by integrating into the composition, a mixture referenced under the name of Genorad 16 and/or Additol S110, alone or in a mixture. The antioxidant can represent less than 3% by weight of the varnish, preferably from 0.1 to 2.0% by weight of the varnish, e.g. on the order of 0.1% by weight of the varnish. As a non-limiting illustration, we will also cite Genorad 16, Genorad 18, Genorad 20, Genorad 21 and Genorad 22 from Rahn, Omnistab IC, Omnistab IN 515, Omnistab IN 516, Omnistab IN 518, Omnistab IN 520, Omnistab IN 522 and Omnistab IN 526 from IGM resins, additol S110, additol S120 and additol S130 from Allnex, alone or in a mixture.

In order to improve the final composition of the varnish while controlling the concentration thereof of photo-initiators, the varnish according to the present invention, can advantageously incorporate at least one self-initiating resin, alone or in a mixture. Amongst the self-initiating resins, we will cite as an example, an acrylate self-initiating resin and/or a self-initiating resin with a molecular weight of more than 400 g/mol, preferably of more than 750 g/mol. Amongst the acrylate self-initiating resins, we will cite e.g.
  same containing at least two ethoxylations and/or propoxylations, and/or
  same with only with only one acrylate functionality, where said functionality is comprised between 3 and 6.

As an illustration of self-initiating resins which can advantageously be used in the varnish composition according to the present invention, we will cite same e.g. Ebecryl LEO 10101 and/or Ebecryl LEO 10102 from ALLNEX, and/or a mixture of two or a plurality of the precited compounds.

Self-initiating resins can represent less than 20% by weight of the varnish, e.g. less than 15% by weight, and/or more than 2% by weight, e.g. more than 5% by weight of the varnish. When a self-initiating resin as defined above is used in a varnish composition according to the present invention, same will be counted only in the self-initiating resin category even if the composition thereof and/or the function thereof could also classify same in another category as described in the present invention.

The varnish can integrate in the composition thereof, a resin which is not defined as an acrylate (i), (ii) and (iii) of the claimed varnish [which is thus neither a light-curing acrylate monofunctional monomer nor a light-curing diacrylate bifunctional monomer, nor a light-curing acrylate monomer with only one acrylate functionality with said functionality comprised between 3 and 6], said resin being preferably chosen from acrylic resins, vinyl resins, ketonic resins, polyesters, aldehydes, epoxy, urethane, and/or polyether. This resin can be added to the composition in a proportion on the order of 5 to 20% by weight of the final mixture. The choice of the resin depends upon the substrate and the desired result. These resins have, e.g., the properties of improving the chemical resistance of the final composition and/or the mechanical resistance of the deposited varnish; same can also provide the varnish properties such as gloss, drying speed and/or flexibility, resistance to water, resistance to UV, resistance to strong acids and/or strong bases; provide protection against corrosion, provide conductivity properties, electrical insulator properties, properties such as lamination, hot transfer, sublimation, properties of reprinting, adhesive and/or resistance to yellowing.

According to the type of varnish to be produced, additional elements can be added to the components.

Thus, for the design of a matt or satin varnish, mattifying agents can be added to the varnish; as an illustration, we will cite mattifying agents with a particle size distribution of less than 50 µm, preferably less than 10 µm, for the design of a matt or satin varnish. The concentration by weight of mattifying agents is generally less than 20%.

To obtain a glitter varnish, glitters can be advantageously added to the varnish; as an illustration, we will cite glitter with a particle size distribution of less than 50 µm, preferably less than 10 µm, for the design of glitter varnish. The concentration by weight of the glitter in the varnish is generally less than 20%.

In certain embodiments of the present invention, the varnish for covering the surface of a substrate and deposited using an inkjet, is characterised in that the varnish composition contains at least one colouring agent. This gives the ink a distinctive colour. The colouring agent can be chosen from dyes, pigments, or a combination of pigments and/or dyes. As an illustration, we will cite fluorescent pigments and/or dyes for the design of fluorescent varnishes, and pigments sensitive to black light for the design of optical-effect varnishes. In certain embodiments of the present invention, the colouring agent represents 0.1 to 35% by weight of the varnish, preferably 1 to 20% by weight of the varnish. The high concentrations of colouring agent generally concern white-colour dyes.

As an illustration, we will cite colouring agents with a particle size distribution of less than 50 µm, preferentially less than 10 µm.

Examples of suitable pigments included, but are not limited to same under the name of Blue Pigment (e.g. Blue Pigment 1, 15, 15:1, 15:2, 15:3, 15:4, 15:6, 16, 24 or 60), Brown Pigment (e.g. Brown Pigment 5, 23 or 25), Yellow Pigment (e.g. Yellow Pigment 3, 14, 16, 17, 24, 65, 73, 74, 83, 95, 97, 108, 109, 110, 113, 120, 128, 129, 138, 139, 150, 154, 156 or 175), Green Pigment (e.g. Green Pigment 1, 7, 10 or 36), Orange Pigment (e.g. Orange Pigment 5, 15, 16, 31, 34, 36, 43, 48, 51, 60, 61 or 71), Red Pigment (e.g. Red Pigment 4, 5, 7, 9, 22, 23, 48, 48:2, 49, 112, 122, 123, 149, 166, 168, 170, 177, 179, 190, 202, 206, 207 or 224), Violet Pigment (e.g. Violet Pigment 19, 23, 32, 37 or 42), Black Pigment (e.g. Black Pigment 6 or 7)—the numbering of coloured pigments corresponding to the "Colour Index", Volumes 1-8, published by the Society of Dyers and Colourists, Yorkshire, England—; we will also cite Black PB 2 and 5; carbon black, titanium dioxide (including rutile and anatase); zinc sulphide; or a mixture of two or a plurality of the precited pigments.

When a pigment used in the ink compositions of the present invention, preference will be given to the pre-dispersion of said pigment into one or a plurality of light-curing monomers, before incorporating the latter monomer(s) into the varnish. Preference will also be given to the use of dispersing agents in order to improve the dispersion of pigments; indeed, these dispersing agents reduce or even prevent any phenomenon of deposition and/or agglomeration of pigments.

The present invention thus also relates to the use of the varnish of the present invention—when the composition of said varnish contains at least one pigment and/or a dye as defined above—directly as ink. This new use is particularly interesting from an industrial point of view because same makes it possible, through the inkjet printing of only one composition according to the present invention, to combine the properties of the ink and of the varnish, and to thus advantageously meet the requirements of the desired use.

Transparent varnish coatings have a preferred concentration of 0% of colouring agent. These transparent varnishes are the preferred varnishes according to the present invention because same are characterised by a better resistance to yellowing.

Thus, in certain embodiments of the present invention, the varnish (for covering the surface of a substrate and inkjet-deposited) has a composition which contains at least:
- a light-curing acrylate monofunctional monomer,
- a light-curing diacrylate bifunctional monomer,
- a light-curing acrylate monomer with only one acrylate functionality, where said functionality is comprised between 3 and 6.
- a photo-initiator,
- an optional self-initiating resin,
- an optional dispersion of nanoparticles, and
- optionally
  - a surfactant, and/or
  - an antioxidant, and/or
  - a resin, and/or
  - a mattifying agent and/or glitter, and/or
  - a colouring agent and where the sum of these components represents preferably et least 70% by weight of the varnish, preferably at least 85% by weight, e.g. at least 95% by weight, or even the entire varnish of the present invention.

In certain embodiments of the present invention, the varnish (for covering the surface of a substrate and inkjet-deposited) has a composition which contains at least:
- a light-curing acrylate monofunctional monomer,
- a light-curing diacrylate bifunctional monomer,
- a light-curing acrylate monomer with only one acrylate functionality, where said functionality is comprised between 3 and 6,
- a photo-initiator, and
- optionally
  - a surfactant, and/or
  - an antioxidant, and/or
  - a resin and where the sum of these components represents preferably at least 70% by weight of the varnish, preferably at least 85% by weight, e.g. at least 95% by weight, and even the entire varnish of the present invention.

In certain embodiments of the present invention, the varnish (for covering the surface of a substrate and inkjet-deposited) has a composition which contains at least:
- a light-curing acrylate monofunctional monomer,
- a light-curing diacrylate bifunctional monomer
- a light-curing acrylate monomer with only one acrylate functionality, where said functionality is comprised between 3 and 6,
- a photo-initiator, and
- optionally
  - a surfactant, and/or
  - an antioxidant, and where the sum of these components represents preferably at least 70% by weight of the varnish, preferably at least 85% by weight, e.g. at least 95% by weight, or even the entire varnish of the present invention.

In the special case where a component of the varnish (due to the composition and/or the function thereof) would belong to a category of families of components defined according to the present invention, these components would be, except for the resins (which do not meet the definition of the acrylates (i), (ii) and (iii) of the claimed varnish), nanoparticles and self-initiating resins,
- counted in each of said families when reference will be made to said family, and
- will be counted only once when reference will be made to the overall composition of the varnish.

In certain preferred embodiments of the present invention, the varnish compositions will not contain
- 2-(2-(vinyloxy)ethoxy ethyl acrylate) "VEER", and/or
- other monomer containing both an acrylate group and another polymerisable group chosen from vinyl ether, allyl ether and/or allyl ester, and/or
- 2-(2-ethoxyethoxy) ethyle acrylate "EOEOEA" due to a toxicity which has proven to be quasi-incompatible with the low-migration application sought within the framework of the present invention, and/or
- tetrahydrofurfuryl acrylate "THFA" due to a toxicity which has proven to be quasi-incompatible with the low-migration application sought within the framework of the present invention, and/or
- Vinylcaprolactam due to a toxicity which has proven to be quasi-incompatible with the low-migration application sought within the framework of the present invention, and/or
- thiol compounds, more particularly organic compounds containing a thiol group [—SH, sulfhydryl group] bound to a carbon atom.

The varnish according to the present invention is thus characterised by a viscosity less than 200 mPa·s at 25° C., e.g. between 8 and 60 mPa·s.

The varnish according to the present invention is thus characterised by a surface tension comprised between 10 mN/m and 50 mN/m at 25° C., e.g. between 20 and 25 mN/m.

In certain preferred embodiments of the present invention, the varnish can thus be printed on a substrate, preferably using inkjet technology, with deposit thicknesses of more than 3 microns, 5 microns, 10 microns, 50 microns and/or 100 microns, and even thicknesses that can reach 300 microns while preserving the low-migration properties thereof. The corresponding legal requirements are available on the site of the "European Printing Ink Association" ("EuPIA", http://www.eupia.org/) and on the site of the European Food Safety Authority ("EFSA", http://www.efsa.europa.eu/fr/). Any suitable method for measuring the migration of the varnish and/or of the components thereof can be used; the methods described in Guide EuPIA1 (see the "EuPIA" website) will be preferred for printing inks applied on the face of food packaging items, which is not in contact with the food. As an illustration for a test which can be used within the framework of the present invention, we will cite the following: 10 cm-side squares are printed and dried on any type of substrate (PVC, PP, PE, coated paper, etc.) at different thicknesses. Same are then brought in contact with a food simulant (e.g. an ethanol solution at 10% by volume, ethanol solution at 20% by volume, acetic acid solution at 3% by weight or plant oil) at a controlled temperature, during a controlled length of time. 15 µL of the food simulant will be measured using HPLC (high-performance liquid chromatography) via a C18 column, and eluted with acidified water and acetonitrile in order to determine the concentration for each of the varnish compounds or of the ink having migrated. In order to determine the concentrations of the different constituents, calibration curves of solutions with known concentrations have been determined beforehand. The quantities thus obtained will then be multiplied by 6 in order to correspond to the specific migration rate. The factor 6 is used to simulate a 10 cm-side box packing 1 liter of food. The specific migration levels thus obtained will have to be lower than the specific migration limits of the compound. These levels are specified in the Swiss order SR817.023.21. The thickness and the covering rate can be limited in order to reduce the migration values.

According to a preferred operating mode, but non-limiting of the invention, the other physical parameters of the components or of the composition in the application, are determined at the indicated temperatures and in the usual pressure conditions at the Earth surface, preferentially on the order of one atmosphere (1013 mBar). This viscosity can be measured using a HAAKE Viscotester 550 viscometer equipped with an NV Cup and with an NV rotor, which are known measuring instruments, marketed by ThermoFisher, involving a temperature control system, connected to a thermostat bath, maintain the varnish sample at 25[deg.]C. The surface tension is also measured with a DSA 100 tensometer, using the sessile drop method, marketed by KRÜSS. The particle size distribution and conductivity are measured with a device for measuring particle sizes, called MASTERSIZER 2000, marketed by MALVERN, and, respectively, by a conductivity meter CYBERSCAN CON 11 from EUTECH INSTRUMENTS with a measuring reference cell ECCONSEN91W/35608-50 with a cell constant of K=1.0.

It should be obvious for a person skilled in the art that the present invention can be used for embodiments in many other specific forms without moving too far from the field of application of the invention as claimed. Therefore, the present embodiments have to be considered as illustrations, and can be modified in the domain defined by the scope of the enclosed claims.

The invention claimed is:

1. A varnish for coating a surface of a substrate and inkjet-deposited, where a varnish composition includes at least:
   i. a light-curing acrylate monofunctional monomer,
   ii. a light-curing diacrylate bifunctional monomer,
   iii. a light-curing acrylate monomer with only one acrylate functionality, with said functionality comprised between 3 and 6,
   iv. a photo-initiator,
   v. an optional dispersion of nanoparticles, and
   vi. an optional self-initiating resin,
wherein
   the varnish contains at least 5% by weight of light-curing acrylate monofunctional monomer including at least two ethoxylations and/or propoxylations,
   the varnish contains at least 20% by weight of light-curing bifunctional diacrylate monomer,
   the varnish contains at least 5% by weight of light-curing acrylate monomer with only the acrylate functionality, said functionality being comprised between 3 and 6, said monomer including at least two ethoxylations and/or propoxylations,
   the photo-initiator contains 50% by weight of a photo-initiator with a molar mass of more than 400 g/mol,
   acrylate monomers and photo-initiators represent at least 45% by weight of varnish,
   the varnish has a viscosity of less than 200 mPa·s at 25° C. and a surface tension comprised between 10 mN/m and 50 mN/m at 25° C., and
the light-curing bifunctional diacrylate monomer consists in a mixture of diacrylates containing at least two ethoxylations and/or propoxylations with diacrylates which do not contain at least two ethoxylations and/or propoxylations.

2. The varnish according to claim 1 wherein the ratio by weight between the diacrylates containing at least two ethoxylations and/or propoxylations and the diacrylates which do not contain at least two ethoxylations and/or propoxylations is comprised between 1:10 and 10:1, e.g. 1:3 and 3:1.

3. The varnish according to claim 2, wherein same contains at least 7.5% by weight of light-curing acrylate monofunctional monomer including at least two ethoxylations and/or propoxylations.

4. The varnish according to claim 1, wherein the concentration, in the varnish, of the light-curing acrylate monofunctional monomer which does not contain two ethoxylations and/or propoxylations is less than 10% by weight, e.g. less than 1% by weight.

5. The varnish according to claim 1 wherein same contains at least 25% by weight of light-curing diacrylate bifunctional monomer, e.g. at least 30% by weight.

6. The varnish according to claim 1 wherein same contains at least 7.5% by weight of light-curing acrylate monomers with only one acrylate functionality, where said functionality is comprised between 3 and 6 containing at least two ethoxylations and/or propoxylations.

7. The varnish according to claim 1 wherein the concentration, in the varnish, of light-curing acrylate monomers with only one acrylate functionality, where said functionality is comprised between 3 and 6 not containing at least two ethoxylations and propoxylations is less than 10% by weight, e.g. less than 1% by weight.

8. The varnish according to claim 1 wherein same contains an antioxidant.

9. The varnish according to claim 1 wherein same contains a surfactant.

10. The varnish according to claim 1 wherein same contains a resin chosen from acrylic resins, vinyl resins, ketonic resins, polyesters, aldehydes, epoxy, urethane, and/or polyether.

11. The varnish according to claim 1 wherein same is transparent and/or in that same does not contain any dye.

12. The varnish according to claim 1 characterised by a viscosity of less than 200 mPa·s at 25° C., e.g. between 8 and 60 mPa·s, and/or a surface tension comprised between 10 mN/m and 50 mN/m at 25° C., e.g. between 20 and 25 mN/m.

13. The varnish according to claim 1 wherein same contains:
   a light-curing acrylate monofunctional monomer,
   a light-curing diacrylate bifunctional monomer,
   a light-curing acrylate monomer with only one acrylate functionality, where said functionality is comprised between 3 and 6,
   a photo-initiator, and optionally
   a surfactant and/or an antioxidant,
and where the sum of these components represents at least 85% by weight, e.g. at least 95% by weight of the varnish.

14. A use of the varnish of claim 1 as low-migration varnish (and/or low-migration ink) for coating packaging materials for cosmetics and/or food.

15. The use of the varnish according to claim 14 in an inkjet printing technology including a drying and/or polymerisation step for said varnish, wherein the temperature at which the varnish is exposed when flowing through the printing heads is comprised between 25 and 80° C., preferably between 35° C. and 50° C., and/or in that the drying and/or polymerisation of said varnish and/or ink is carried out within ranges of substrate movement from 0.05 to 10 m/s, e.g. from 0.05 to 2 m/s.

16. The use of a varnish according to claim 14 in an inkjet printing technology wherein the technology includes a drying and/or polymerisation step for said varnish, and in that this step includes the exposure of the varnish to an ultraviolet radiation, e.g. to UV radiation from a conventional UV lamp, or to UV radiation from a light-emitting diode (LED), preferably to UV radiation from a combination of a light-emitting diode (LED) and a conventional UV lamp.

17. The use of a varnish according to claim 14 for the coating of packaging materials for products, using inkjet technology, with deposition thicknesses of more than 3 microns, 5 microns, 10 microns, 50 microns and/or 100 microns, and even thicknesses that can reach 300 microns while preserving the low-migration properties thereof.

\* \* \* \* \*